United States Patent
Kutter et al.

(10) Patent No.: US 12,221,566 B2
(45) Date of Patent: Feb. 11, 2025

(54) METHOD FOR PRODUCING AN ADHESIVE TAPE

(71) Applicant: TESA SE, Norderstedt (DE)

(72) Inventors: Alexander Kutter, Norderstedt (DE); Lars Guldbrandsen, Norderstedt (DE); Daniel Schmitz-Stapela, Norderstedt (DE)

(73) Assignee: TESA SE, Norderstedt (DE)

(*) Notice: Subject to any disclaimer, the term of this patent is extended or adjusted under 35 U.S.C. 154(b) by 0 days.

(21) Appl. No.: 18/251,609

(22) PCT Filed: Dec. 20, 2021

(86) PCT No.: PCT/EP2021/086700
§ 371 (c)(1),
(2) Date: May 3, 2023

(87) PCT Pub. No.: WO2022/136218
PCT Pub. Date: Jun. 30, 2022

(65) Prior Publication Data
US 2024/0141207 A1 May 2, 2024

(30) Foreign Application Priority Data
Dec. 22, 2020 (DE) .................... 10 2020 216 457.6

(51) Int. Cl.
C09J 7/21 (2018.01)
C09J 7/38 (2018.01)
C09J 7/50 (2018.01)

(52) U.S. Cl.
CPC . C09J 7/21 (2018.01); C09J 7/38 (2018.01); C09J 7/50 (2018.01); C09J 2203/302 (2013.01);
(Continued)

(58) Field of Classification Search
CPC . C09J 7/21; C09J 7/38; C09J 2203/302; C09J 2400/263; C09J 2433/003
See application file for complete search history.

(56) References Cited

U.S. PATENT DOCUMENTS
2019/0136097 A1* 5/2019 Kutter .................. B29C 48/08

FOREIGN PATENT DOCUMENTS
EP 2520629 A1 11/2012
WO 2019086705 A2 5/2019

OTHER PUBLICATIONS
International Search Report for corresponding application PCT/EP2021/086700 dated Apr. 7, 2022.
(Continued)

*Primary Examiner* — Nathan T Leong
(74) *Attorney, Agent, or Firm* — Norris McLaughlin, PA

(57) ABSTRACT

An adhesive tape (1) which requires a smaller amount of adhesive by comparison with conventional adhesive tapes having the same adhesive properties is obtained using a method for producing an adhesive tape, which method comprises the following steps: a) mixing an ASE thickener with water and producing an (ASE) thickener-water mixture (7); b) producing an adhesive dispersion (8) from an adhesive and a solvent; c) providing a textile substrate (2); d) applying the (ASE) thickener-water mixture (7) to the textile substrate; e) applying the adhesive dispersion (8) to the (ASE) thickener-water mixture (7) in order to obtain the adhesive tape; f) drying the obtained adhesive tape; in which method the thickener, in particular the ASE thickener, is saturated with water and the adhesive dispersion (8) is applied after or at the same time as the (ASE) thickener-water mixture (7) is applied.

16 Claims, 1 Drawing Sheet

(52) U.S. Cl.
CPC .... *C09J 2400/263* (2013.01); *C09J 2433/003* (2013.01)

(56) References Cited

OTHER PUBLICATIONS

Shay: "Alkali-Swellable and Alkali-Soluble Thickener Technology a Review", Suspensions: Fundamentals and Applications in the Petroleum Industry, American Chemical Society, Washington, DC, Bd. 223, Jan. 1, 1989, Seiten, 457-494, XP008001247.
Petrie: "Rheology Modifiers Selection for Adhesives and Sealants-selection-guide/rheology-modifiers-selection-for-adhesives", Feb. 16, 2017, Seiten, 1-40, XP055904838.

* cited by examiner

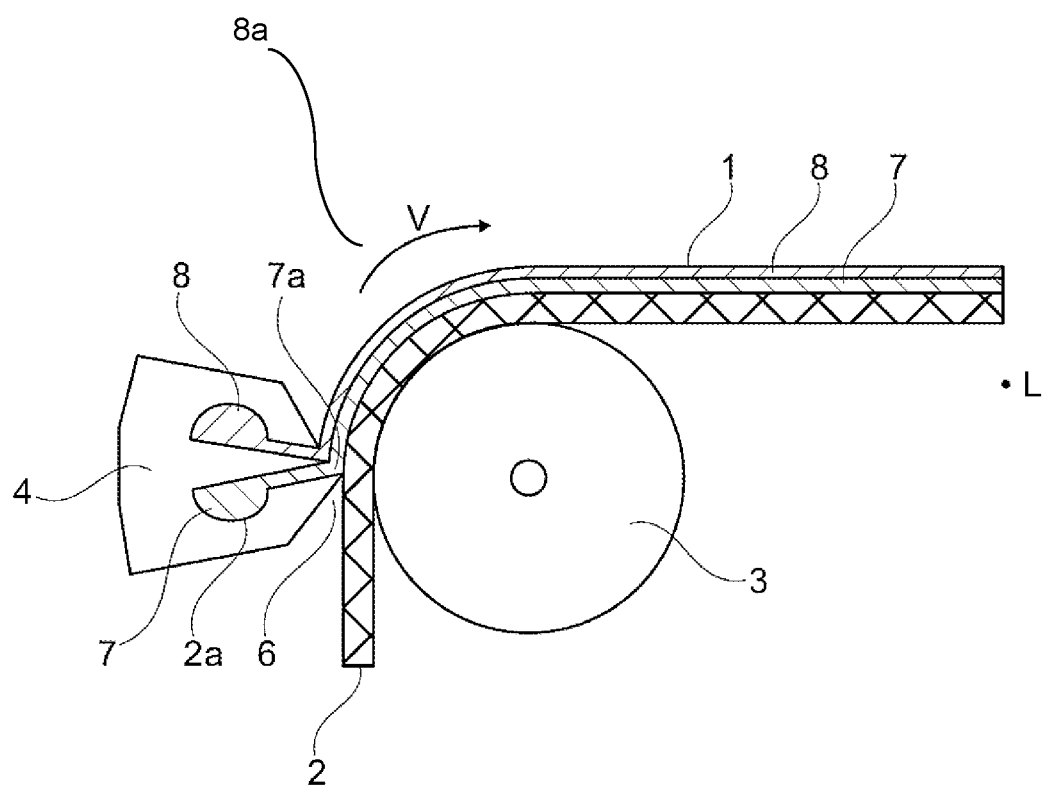

METHOD FOR PRODUCING AN ADHESIVE TAPE

This is an application filed under 35 USC 371 based on PCT/EP2021/086700 filed 20, Dec. 2021, which claimed priority to DE 10 2020 216 457.6 filed 22, Dec. 2020. The present application claims the full priority benefit of all prior applications and incorporates by reference their full disclosures as if set forth herein.

The invention relates to a method for producing an adhesive tape, comprising the following steps:
a) mixing a thickener, more particularly an ASE thickener, with water and producing an (ASE) thickener-water mixture;
b) producing an adhesive dispersion from an adhesive and a solvent;
c) providing a textile carrier;
d) applying the (ASE) thickener-water mixture to the textile carrier;
e) Applying the adhesive dispersion to the (ASE) thickener-water mixture, to give the adhesive tape;
f) drying the adhesive tape obtained, Adhesive tapes have long been used in industry for producing cable looms. In this application, the adhesive tapes serve to bundle a multiplicity of electrical leads, prior to installation or in the ready-mounted state, in order by bandaging to reduce the space taken up by the bundle of leads and also to obtain additional protective functions.

Disclosed by DE 10 2011 075 160 A1 is an adhesive tape having a textile carrier bearing on one side an applied pressure-sensitive adhesive, the pressure-sensitive adhesive being constructed of a dried, electron beam-crosslinked, polymeric acrylate dispersion. The acrylate dispersion comprises monomeric acrylates and ethylenically unsaturated comonomers which are not acrylates. The pressure-sensitive adhesive additionally contains between 10 and 100 wt % of a tackifier. Here, initially, an aqueous acrylate dispersion is applied to the carrier, and is subsequently dried.

Disclosed by EP 2 695 926 A1, furthermore, are adhesive tapes for the wrapping of cables, having a carrier and a dried polymer dispersion applied on one side of the carrier, the polymer being synthesized from 95 to 100 wt % of ethyl acrylate and/or 2-ethylhexyl acrylate and 0.0 to 5.0 wt % of an ethylenically unsaturated monomer having an acid or acid anhydride function.

A problem when applying the polymer dispersion to the textile carrier is the fact that low-viscosity polymer dispersions "strike" through the carrier, the latter being very coarse-pored, porous and/or permeable. This gives rise to the problem firstly that a very large quantity of polymer dispersion ha to be utilized in order to obtain full-area application on the one textile side, and secondly that when the dried adhesive tape is wound up to a roll, the individual plies stick to one another and rule out the possibility of subsequent unwinding.

On the other hand, when using high-viscosity polymer dispersions, strike-through between the time of application and the time of drying is indeed no longer possible, but polymer dispersions of high viscosity are difficult to process. They must be applied under high pressure through a line system and a nozzle system to the carrier; the nozzles utilized frequently are simply not designed for such high operating pressures. Against this background, there is a fundamental interest in using low-viscosity adhesives, since they are less problematic to process.

WO 2019/086705 therefore proposes providing a tapelike carrier to which a thickener and, separately, an aqueous, dispersion-based adhesive, based more particularly on acrylate or on polyurethane, are applied. The aqueous dispersion-based adhesive and the thickener come into contact with one another after or during application. The dispersion-based adhesive is subsequently dried, to give the adhesive tape.

A disadvantage of the adhesive tape disclosed there is that the viscosity range of the thickener is naturally only small. It is by way of the viscosity, however, that the application procedure and the properties of the completed adhesive tape can be controlled. If the variation possibilities for the viscosity are limited, then the variation possibilities for the properties of the completed adhesive tape are restricted as well.

It is an object of the present invention, therefore, to improve a method for producing an adhesive tape and in particular to enlarge the spectrum for controlling the properties of the adhesive tape.

The object is achieved in accordance with the invention in that in a method of the abovementioned type, the thickener, more particularly ASE thickener, is saturated with water and in that the applying of the adhesive dispersion takes place after or synchronously with the applying of the thickener-water mixture, more particularly (ASE) thickener-water mixture. The viscosity of the thickener layer varies according to the ratio of thickener, more particularly ASE thickener, to water. It is possible accordingly to vary the properties of the thickener layer and hence the properties of the adhesive tape, which can be adjusted consequently within a wide range. These controllable properties include the penetration depth of the adhesive dispersion, which influences the cohesion in turn.

As well as ASE thickeners, one preferred embodiment of the invention also uses HASE (hydrophobically modified alkali-swellable emulsion) thickeners.

When the (ASE) thickener-water mixture is mentioned below, the skilled person knows that at this point the disclosure is not confined to the preferred mixture of ASE thickener and water; instead, the skilled person at the same time understands, generally, a mixture of any desired thickener and water.

"Saturated with water" means in the sense of the present invention that water is in excess in the (ASE) thickener-water mixture, thus that all the thickener has been consumed and the (ASE) thickener-water mixture is unable to bind any more water. In contrast to the prior art, therefore, the method of the present invention does not employ pure thickener (100%) but rather a thickener-water mixture.

With the method of the invention it is possible, firstly, to coat open, coarse-pored, porous and/or permeable carriers with an adhesive dispersion without any adhesive strike-through occurring. Adhesive strikethrough of this kind would mean adhesive deeply penetrating or penetrating through the carrier and not being available as an effective coating. This in turn would have the unwanted effect that an unnecessarily large quantity of adhesive would be needed in order to achieve a particular peel adhesion. With the present invention it is possible for the adhesive to penetrate only into the upper layers of the carrier, but not into the deep carrier layers, let alone to penetrate all the way through the carrier.

The thickener layer serves as a buffer layer between textile carrier and adhesive. By way of the buffer layer it is possible to exert very effective control over the properties of the adhesive tape. Depending on the thickness of the buffer layer, a good or a weak anchoring of the adhesive can be achieved. If the buffer layer is thick, the adhesive dispersion sinks in only slowly, and only weak anchoring of the adhesive in the carrier is produced. Where, on the other hand, only a thin buffer layer is used, the adhesive penetrates far into the carrier, resulting in stronger anchoring of the adhesive. Owing to the buffer layer in the form of the thickener, more particularly ASE thickener, the amount of adhesive dispersion which must be applied to the carrier goes down. Because the adhesive dispersion is more expensive than the thickener, the costs of the adhesive tape can be reduced in this way.

A further cost reduction relative to conventional methods comes from the fact that the adhesives which must be processed are not of high viscosity, necessitating special assemblies. Moreover, the cost and complexity of preparation and subsequent cleaning are much lower if the adhesives employed are not of high viscosity.

A further effect of the thickener layer is to level out the very irregular surface of the textile carrier. In this way it is possible to improve the coated appearance on application of the adhesive dispersion, a phenomenon which is reflected in turn in improved peel adhesion.

The drying after the application of (ASE) thickener-water mixture and adhesive dispersion causes the water and any further solvent to evaporate, leaving a continuous polymer film present on the and in the textile carrier.

As a result of the thickener layer, the adhesive is concentrated close to the surface. The adhesive has a relatively narrow distribution. Through the localization of the adhesive in the upper layers, the fibers in the lower layers of the textile carrier stick together less, and this, as a result of the winding tension, leads to less compressed/compact rolls after the subsequent slitting and winding operation.

A particularly suitable viscosity of the (ASE) thickener-water mixture is achieved if the weight ratio of water to thickener, more particularly ASE thickener, is from 1:1 to 10:1, more preferably from 1:1 to 5:1, more particularly from 1:1 to 2:1. A weight ratio of this kind, or the viscosity which results from it, leads to an adhesive tape in which there is a good trade-off between desired anchoring and required amount of adhesive dispersion.

Particularly good anchoring in the textile carrier is achieved with the method according to the present invention if the (ASE) thickener-water mixture contains from 5 up to 25 wt %, preferably from 10 up to 20 wt %, of an adhesive, and more preferably of the same adhesive which is also present in the adhesive dispersion. In this way, even better binding of the thickener layer to the layer of adhesive is achieved, which in turn improves the anchoring of the layer of adhesive in the textile carrier.

Preferably, the adhesive dispersion has a solids content of 10 to 70 wt %, more particularly of 50 to 60 wt % of adhesive, and the thickener layer has a solids content of, in particular, 10 to 20 wt % of adhesive. In this way, particularly good anchoring of the adhesive in the textile carrier is achieved. Furthermore, the amount of adhesive used is reduced without any deterioration in adhesive performance.

In a further particularly preferred variant of the method of the invention, up to 20 wt %, preferably up to 10 wt %, more particularly up to 5 wt % of a thickener is used in the adhesive dispersion. With this it is possible to adjust the viscosity of the adhesive dispersion such that the adhesive dispersion can be applied particularly effectively to the thickener layer, specifically in the case either of simultaneous application or of application of (ASE) thickener-water mixture and adhesive dispersion with a slight offset. Compared with the prior-art methods, the method of the invention entails much less thickening of the adhesive dispersion, with the effect that this dispersion remains readily handlable, readily pumpable and easy to apply.

In one particularly preferred embodiment of the method, the layer of adhesive (=upper layer=functional layer) has a lower viscosity than the thickener layer (=lower layer=buffer layer or filling layer). Conversely, with preference, the upper layer has a higher adhesive content than the lower layer.

The (ASE) thickener-water mixture may be applied immediately before the aqueous dispersion-based adhesive. The time difference is preferably from 0.1 ms (especially when using a dual die) up to 100 s (when using a second, separate coating system), more preferably from 0.5 ms to 20 s, especially preferably from 1 ms to 10 s, and more particularly from 1 ms to 10 ms, in each case when carrying out wet-on-wet coating in one operation.

In another preferred variant, the (ASE) thickener-water mixture and the aqueous dispersion-based adhesive are applied simultaneously.

A concept utilized by the invention is that of not directly applying a high-viscosity dispersion-based adhesive to one side of the carrier layer and drying it, in order thus to produce an adhesive tape which can be wound up. Since high-viscosity dispersion-based adhesives are difficult to handle, they have to be pressed under high pressure through a slot die and first fed to the die through a line system. The processing of a high-viscosity dispersion-based adhesive is associated with the generation of high pressures.

A concept utilized by the invention is that of applying a thickener and an adhesive dispersion to a textile carrier. The thickener layer forms a buffer for the adhesive dispersion, meaning that the adhesive dispersion is able to penetrate only very little into the textile carrier and more particularly is unable to strike through the carrier.

Since in the case of the present invention (ASE) thickener-water mixture and adhesive dispersion are applied to the same side of the textile carrier and there is no adhesive strikethrough, the side of the textile carrier remote from the application side remains completely dry, in other words uncontaminated either by the (ASE) thickener-water mixture or by the adhesive dispersion. After (ASE) thickener-water mixture and adhesive dispersion have dried, the adhesive tape can be wound up with no problems.

According to one preferred embodiment of the invention, the (ASE) thickener-water mixture is applied over the full area to the textile carrier. With further preference, the adhesive dispersion is likewise applied over the full area to the (ASE) thickener-water mixture that has been applied over the full area.

The method of the invention may have a number of variants.

Hence the (ASE) thickener-water mixture may be applied over the full area to the textile carrier, while the adhesive dispersion is coated partially, more particularly in one or more stripes running in machine direction.

Furthermore, the (ASE) thickener-water mixture may also be applied partially, with the adhesive dispersion then being coated only in regions in which the (ASE) thickener-water mixture has also been applied. With further preference, (ASE) thickener-water mixture and adhesive dispersion are applied in one or more stripes running in machine direction, with the stripes of (ASE) thickener-water mixture preferably having a greater width than the stripes of adhesive dispersion.

The (ASE) thickener-water mixture and the adhesive dispersion are preferably applied using a dual slot die, which may preferably have a slot width (also referred to as height)

of 20 to 700 µm, more particularly of 50 to 500 µm, more particularly still of 100 to 300 µm, and a length corresponding to the width of the textile carrier; lengths between 10 to 4000 mm, preferably between 1000 and 2000 mm, are used here; alternatively, all other die lengths are conceivable.

It is also possible for the (ASE) thickener-water mixture and the adhesive dispersion to be applied by two slot dies arranged in series.

Beneficially, the textile carrier is routed around a coating roll, and lies with a side remote from the application side on the coating roll, and is advanced by rotary motions of the coating roll. Provided on the adhesive side of the textile carrier, preferably, is a dual slot die; in this case, the feed rate of the textile carrier and a slot spacing of the dual slot die are selected such that the adhesive dispersion is applied in turn to the (ASE) thickener-water mixture only for instance 1 to 10 ms after the (ASE) thickener-water mixture has been applied to the textile carrier. The (ASE) thickener-water mixture hinders the adhesive dispersion from penetrating deeply into the textile carrier. A low level of penetration of the adhesive dispersion into the textile carrier is desirable, so that the dispersion-based adhesive and the textile carrier form a firm bond with one another. Following application, adhesive and thickener are dried, to give a pressure-sensitive adhesive tape which can be wound up.

A dispersion-based adhesive is beneficially used that has a viscosity of 0.2 Pa*s to 30 Pa*s±5 Pa*s, more particularly 0.5 Pa*s to 15 Pa*s±5 Pa*s. With further preference, the viscosity of the dispersion-based adhesive is between 2 to 5 Pa*s. It is particularly advantageous if the viscosity of the (ASE) thickener-water mixture is similar to or more preferably greater than that of the adhesive dispersion.

The viscosity measurement is performed with an ARES rheometer (Rheometric Scientific) at room temperature and at a shear rate of $100 \text{ s}^{-1}$ using a cone/plate system with a diameter of 50 mm.

An apparatus for performing the method of the invention comprises a coating roll having a longitudinal coating roll direction, and a dual slot die having a longitudinal slot direction which is disposed along the longitudinal coating roll direction; the two longitudinal directions are preferably disposed parallel to one another.

A first slot die and a second slot die are disposed on one side of a textile carrier.

Provided between the dual slot die and the coating roll is a free distance which forms a kind of slot through which a textile carrier can be fed. The textile carrier is steered around the coating roll and advanced by the coating roll or another facility. A feed direction of the textile carrier is disposed transversely, preferably perpendicularly, to the longitudinal direction of the coating roll and/or of the dual slot die.

A first slot die of the dual slot die is provided with a supply facility with an (ASE) thickener-water mixture, the slot die being in fluid-conducting communication with the supply facility for the (ASE) thickener-water mixture. The (ASE) thickener-water mixture is preferably provided in a reservoir vessel and is passed to the first slot die via a pipeline system, which is part of the supply facility, from where it is applied to a side of the textile carrier remote from the coating roll.

A second slot die of the dual slot die is in communication with a second supply facility with an aqueous adhesive dispersion. The second slot die is likewise part of the dual slot die and is in fluid-conducting communication, via the second supply facility, with a reservoir for the adhesive dispersion. In accordance with the invention, the first slot die is disposed ahead of the second slot die in the feed direction.

This ensures that the first slot die first applies the thickener on the side of the textile carrier remote from the coating roll, and immediately thereafter the second slot die applies the adhesive dispersion to the textile carrier that has been provided with the thickener.

There is preferably a drying facility for an adhesive tape downstream of the dual slot die in the feed direction.

The drying facility withdraws the water from the aqueous dispersion-based adhesive and so dries the dispersion-based adhesive on the textile carrier.

The choice of the adhesive dispersion and of the thickener is described in context later on below.

Accordingly, the method of the invention serves in particular for producing an adhesive tape, more particularly for wrapping cables, from a preferably textile carrier and from a pressure-sensitive adhesive which is applied on at least one side of the carrier and takes the form of a dried polymer dispersion, the polymer being synthesized from:

(a) 95.0 to 100.0 wt % of n-butylacrylate and/or 2-ethylhexylacrylate
(b) 0.0 to 5.0 wt % of an ethylenically unsaturated monomer having an acid function or acid anhydride function.

The polymer preferably consists of 95.0 to 99.5 wt % of n-butylacrylate and/or 2-ethylhexylacrylate and of 0.5 to 5 wt % of an ethylenically unsaturated monomer having an acid function or acid anhydride function, and more preferably of 98.0 to 99.0 wt % of n-butylacrylate and/or 2-ethylhexylacrylate and of 1.0 to 2.0 wt % of an ethylenically unsaturated monomer having an acid function or acid anhydride function.

Besides the acrylate polymers listed, the pressure-sensitive adhesive may, in addition to any residual monomers present, be admixed additionally with the tackifiers and/or adjuvants mentioned later on below, such as light stabilizers or ageing inhibitors, in the quantities likewise stated below.

In particular, there are no further polymers such as elastomers present in the pressure-sensitive adhesive, meaning that the polymers of the pressure-sensitive adhesive consist only of the monomers (a) and (b) in the proportions indicated.

Preferably, n-butylacrylate forms the monomer (a).

Contemplated advantageously as monomer (b) are, for example, acrylic acid, methacrylic acid, itaconic acid, maleic acid, fumaric acid and/or maleic anhydride.

Preference is given to (meth)acrylic acid of the formula I,

(I)

where $R^3$=H or $CH_3$; with preference, optionally, the mixture of acrylic acid or methacrylic acid is used. Acrylic acid is particularly preferred.

According to one particularly preferred variant, the composition of the polymer is as follows:

(a) 95.0 to 100.0 wt %, preferably 95.0 to 99.5 wt %, more preferably 98.0 to 99.0 wt % of n-butylacrylate and
(b) 0.0 to 5.0 wt %, preferably 0.5 to 5.0 wt %, more preferably 1.0 to 2.0 wt % of acrylic acid.

The polymer dispersion is prepared by the process of emulsion polymerization of the stated components. Descriptions of this process can be found for example in: "Emulsion Polymerization and Emulsion Polymers" by Peter A. Lovell and Mohamed S. El-Aasser—Wiley-VCH 1997—ISBN 0-471-96746-7 or in EP 1 378 527 B1.

In the polymerization it is not impossible for not all of the monomers to be converted to polymers. In that case it is obvious that the residual monomer content is to be as small as possible.

Adhesives preferably provided are those comprising the polymer dispersion with a residual monomer content of less than or equal to 1 wt %, more particularly less than or equal to 0.5 wt % (based on the mass of the dried polymer dispersion).

The dispersion-based adhesive of the adhesive dispersion is a pressure-sensitive adhesive, in other words an adhesive which even under relatively weak applied pressure allows a durable bond to virtually all substrates and which after use can be detached from the substrate again substantially without residue. At room temperature, a pressure-sensitive adhesive is permanently adhesive, thus having a sufficiently low viscosity and a high touch-tack, so that it wets the surface of the respective substrate even at low applied pressure. The bondability of the dispersion-based adhesive derives from its adhesive properties, and the redetachability from its cohesive properties.

In order to achieve pressure-sensitive adhesive properties, the dispersion-based adhesive at the processing temperature must be above its glass transition temperature in order to have viscoelastic properties. Since the wrapping of a cable harness takes place at standard ambient temperature (approximately between 15° C. to 25° C.), the glass transition temperature of the pressure-sensitive adhesive formulation is preferably below +15° C. (determined by DSC (Differential Scanning calorimetry) in accordance with DIN 53 765 at a heating rate of 10 K/min).

The glass transition temperature of the acrylate copolymers may be estimated in accordance with the Fox equation from the glass transition temperatures of the homopolymers and from their relative proportions.

In order to obtain polymers, as for example pressure-sensitive adhesives or heat-sealing compounds, having desired glass transition temperatures, the quantitative composition of the monomer mixture is advantageously selected in such a way as to give the desired $T_G$ value for the polymer in accordance with an equation (E1) in analogy to the Fox equation (cf. T. G. Fox, Bull. Am. Phys. Soc. 1956, 1, 123).

$$\frac{1}{T_G} = \sum_n \frac{w_n}{T_{G,n}} \qquad (E1)$$

The possible addition of tackifiers automatically raises the glass transition temperature, depending on amount added, compatibility and softening temperature, by around 5 to 40 K.

Acrylate copolymers having a glass transition temperature of at most 0° C. are therefore preferred.

The polymers of the invention have a peel adhesion to steel in accordance with ASTM D3330 of at least 1.0 N/cm (for a surface weight of the dispersion-based adhesive of 30 g/m² on a 23 µm polyester film carrier).

A "tackifier resin" is understood in accordance with the general understanding of the skilled person to refer to an oligomeric or polymeric resin which raises the autoadhesion (the tack, the intrinsic stickiness) of the pressure-sensitive adhesive by comparison with the otherwise identical pressure-sensitive adhesive that contains no tackifier resin.

The use of tackifiers for boosting the peel adhesion of pressure-sensitive adhesives is known fundamentally. This effect also comes about if the dispersion-based adhesive is admixed with up to 15 wt % (corresponding to <15 parts by weight), or 5 to 15 wt %, of tackifier (based on the mass of the dried polymer dispersion). Preference is given to adding 5 to 12, more preferably 6 to 10 wt % of tackifier (based on the mass of the dried polymer dispersion).

Suitable tackifiers, also referred to as tackifier resins, include in principle all known classes of compounds. Tackifiers are, for example, hydrocarbon resins (for example, polymers based on unsaturated $C_5$ or $C_9$ monomers), terpene-phenol resins, polyterpene resins based on raw materials such as α- or β-pinene, for example, aromatic resins such as coumarone-indene resins or resins based on styrene or α-methylstyrene such as rosin and derivatives thereof, examples being disproportionated, dimerized or esterified rosin, as for example reaction products with glycol, glycerol or pentaerythritol, to name but a few. Preferred resins are those without readily oxidizable double bonds such as terpene-phenol resins, aromatic resins and, with particular preference, resins prepared by hydrogenation, such as, for example, hydrogenated aromatic resins, hydrogenated polycyclopentadiene resins, hydrogenated rosin derivatives or hydrogenated polyterpene resins.

Preferred resins are those based on terpene-phenols and rosin esters. Likewise preferred are tackifier resins having a softening point of more than 80° C. as per ASTM E28-99 (2009). Particularly preferred are resins based on terpene-phenols and rosin esters with a softening point of more than 90° C. as per ASTM E28-99 (2009). The resins are usefully employed in dispersion form. In that form they can be mixed readily with the polymer dispersion in finely divided form.

A particularly preferred variant of the invention is that wherein no tackifier resins at all are added to the pressure-sensitive adhesive.

Surprisingly and unforeseeably for the skilled person, the absence of tackifier resins from the adhesive tape does not—as the skilled person would have expected—lead to an insufficient peel adhesion. Surprisingly, moreover, the flagging behavior is not poorer either.

The dispersion-based adhesive is diluted with a solvent for the adhesive dispersion. A particularly preferred solvent is water. The viscosity of the unthickened adhesive dispersion is preferably in the range of η=0.1 to 10 Pa*s.

With the method of the invention, furthermore, it is also possible to apply adhesives based on polyurethane dispersions.

Further typical dispersion-based adhesives are described in section 3.5 of the specialist book "Kleben-Grundlagen, Technologien, Anwendungen" [Adhesive bonding—Principles, technologies, applications] by G. Habenicht, 2009, Springer Verlag, Berlin/Heidelberg.

The fractions of thickener or rheological additives, after the mixing of thickener and dispersion-based adhesives, are in the range from 0.1 to 5 wt %, based on the mass of the dried polymer dispersion.

A fundamental distinction is made between organic and inorganic rheological additives.

The organic thickeners divide in turn into two essential modes of action: (i) the thickening of the aqueous phase, i.e., non-associative, and (ii) association between thickener molecule and particles, in part with incorporation of the stabilizers (emulsifiers). Representatives of the first (i) compound group are water-soluble polyacrylic acids and polycoacrylic acids, which in the basic medium form polyelectrolytes of high hydrodynamic volume. The skilled person also refers to these for short as ASE (alkali-swellable emulsion). They are distinguished by high resting shear viscosities and strong shear thinning. Another class of compound are the modified polysaccharides, especially cellulose ethers such as carboxymethylcellulose, 2-hydroxyethylcellulose, carboxymethyl-2-hydroxyethylcellulose, methylcellulose, 2-hydroxyethylmethylcellulose, 2-hydroxyethylethylcellulose, 2-hydroxypropylcellulose, 2-hydroxypropylmethylcellulose, 2-hydroxybutylmethylcellulose. Additionally included in this class of compound are less widespread polysaccharides such as starch derivatives and specific polyethers.

The activity group of the (ii) associative thickeners are, in principle, block copolymers having a water-soluble middle block and hydrophobic end blocks, the end blocks interacting with the articles or with themselves and so forming a three-dimensional network with incorporation of the particles. Typical representatives are familiar to the skilled person as HASE (hydrophobically modified alkali-swellable emulsion), HEUR (hydrophobically modified ethylene oxide urethane) or HMHEC (hydrophobically modified hydroxyethyl cellulose). In the case of the HASE thickeners, the middle block is an ASE and the end blocks are usually long, hydrophobic alkyl chains coupled on via polyethylene oxide bridges. In the case of the HEUR, the water-soluble middle block is a polyurethane, and in the case of the HMHEC it is a 2-hydroxyethylcellulose. The nonionic HEUR and HMHEC, in particular, are largely insensitive to pH.

Alkali-activatable thickeners of these kinds are available commercially and described for example in the article by Charles Jones, Sylvie Doulut and Paul Reeve (Rohm & Haas Company) with the title "Developments in rheology modifiers suitable for use in surfactant containing formulations" (October 2002).

Depending on structure, the associative thickeners produce more or less a Newtonian (shear rate-independent) or pseudoplastic (shear-liquefying) flow behavior. Occasionally they also exhibit a thixotropic character, meaning that the viscosity is dependent not only on shearing force but also on time.

The inorganic thickeners are mostly layer silicates of natural synthetic origin, examples being hectorites and smectites. In contact with water, the individual layers part from one another. At rest, as a result of different charges on surfaces and edges of the platelets, they form a space-filling house-of-cards structure, resulting in high resting shear viscosities through to yield points. On shearing, the house-of-cards structure collapses and a marked drop in the shear viscosity is observed. Depending on charge, concentration and geometrical dimensions of the platelets, the development of structure may take some time, and so with inorganic thickeners of this type it is also possible to achieve thixotropy.

Layer silicates, or else sheet silicates or phyllosilicates, are known for use as ion exchangers. Known layer silicates are clay minerals such as montmorillonite, nontronite, hectorite, saponite, sauconite, beidellite, allevardite, illite, halloysite, attapulgite and/or sepiolite and also disteardimonium hectorite. Hectorites are $M_{0,3}^+(Mg_{2,7}Li_{0,3})[Si_4O_{10}(OH)_2]$, $M^+$ usually=$Na^+$, a monoclinic clay mineral belonging to the smectites and similar to montmorillonite. Preferred in accordance with the invention are modified three-layer silicates or here, utilized synonymously, modified three-layer clay minerals such as illites, smectites or vermiculites, for example. Particularly preferred for use in the pressure-sensitive adhesives of the invention are the following modified layer silicates: montmorillonite, hectorite or smectite.

The nonmodified layer silicates can, according to the manufacturers, be activated with polar additions and high shearing forces in order to develop their full activity (for example, product information on Tixogel 6 VP-V (Quaternium-90 Bentonite) from Rockwood Additives Ltd. or on Bentone® 38 (organic derivative of a magnesium layer silicate (hectorite)) from Rheox Inc.

This activation of the layer silicates, meaning their conversion to a swellable form, is accomplished by treating the layer silicates with a polar liquid and high shearing forces. The resulting layer silicates are considered to be modified layer silicates. Equally it is also possible to use modified layer silicates under the designation Laptonite®, Optigel®, Laptonite SL 25®, Laptonite S482®, Laptonite EP®, Laptonite RDS®, Optigel CK® from Rockwood. Preference is given to the natural and synthetic, organically surface-modified three-layer silicates.

Laptonites are colloidal, synthetic layer silicates (hectorites, with lithium) whose platelet diameter is between 20 to 30 nm, preferably around 25 nm, and whose thickness is around 1 nm. Owing to the low size of the platelets, a very rapid reconstruction of the house-of-cards structure is possible, in which the edges of each platelet lie against the face of an adjacent layer silicate platelet. The three-layer silicates can easily be stirred into water and form a clear, colorless dispersion. They may form a gel (high-viscosity colloidal dispersion) or a sol (low-viscosity colloidal dispersion).

For the thickener layer of the present invention, nonassociative thickeners, specifically ASE thickeners, are preferably employed. The viscosity of the ASE thickener here is preferably $\eta=15$ to 100 Pa*s at a shear rate of 10 $s^{-1}$.

Where the adhesive dispersion as well contains a thickener, the latter may be either a nonassociative or an associative thickener.

The thickeners may in part be stirred directly into the adhesive dispersion or in part are advantageously predispersed or prediluted in water beforehand.

Suppliers of thickeners are, for example, OMG Borchers, Omya, Byk Chemie, Dow Chemical Company, Evonik, Rockwood or Munzing Chemie.

Suitable carriers include in principle all carrier materials, preferably textile carriers and more preferably woven fabrics, more particularly woven polyester fabrics.

As carrier material for the adhesive tape it is possible to use all known textile carriers such as drawn-loop knits, scrims, tapes, braids, needle pile textiles, felts, woven fabrics (encompassing plain weave, twill and satin weave), loop-formed knits (encompassing warp knits and other knits) or nonwoven webs, the term "nonwoven web" comprehending at least sheetlike textile structures in accordance with EN 29092 (1988) and also stitchbonded webs and similar systems.

It is likewise possible to use woven and knitted spacer fabrics with lamination.

Spacer fabrics of these kinds are disclosed in EP 0 071 212 B1. Spacer fabrics are mat-like layer structures comprising a cover layer of a fiber or filament web, an underlayer and individual retaining fibers or bundles of such fibers between these layers, these fibers being distributed over the area of the layer structure, being needled through the particle layer and joining the cover layer and the underlayer to one another. As an additional although not mandatory feature, the retaining fibers in accordance with EP 0 071 212 B1 contain particles of inert minerals, such as sand, gravel or the like, for example.

The retaining fibers needled through the particle layer hold the cover layer and the underlayer at a distance from one another and are joined to the cover layer and the underlayer.

Nonwovens contemplated include, in particular, consolidated staple fiber webs, but also filament webs, meltblown webs and spunbonded webs, which generally require additional consolidation. Possible consolidation methods known for webs include mechanical, thermal and chemical consolidation. If with mechanical consolidations the fibers are held together purely mechanically usually by entanglement of the individual fibers, by the interlooping of fiber bundles or by the stitching-in of additional threads, it is possible by thermal and by chemical techniques to obtain adhesive (with binder) or cohesive (binderless) fiber-fiber bonds. Given appropriate formulation and an appropriate process regime, these bonds may be restricted exclusively, or at least predominantly, to fiber nodal points, so that a stable, three-dimensional network is formed while nevertheless retaining the relatively loose, open structure in the web.

Webs which have proved to be particularly advantageous are those consolidated in particular by overstitching with separate threads or by interlooping.

Consolidated webs of this kind are produced for example on stitchbonding machines of the "Malimo" type from the company Karl Mayer, formerly Malimo, and can be obtained from companies including Techtex GmbH. A Malifleece is characterized in that a cross-laid web is consolidated by the formation of loops from fibers of the web.

The carrier used may also be a web of the Kunit or Multiknit type. A Kunit web is characterized in that it originates from the processing of a longitudinally oriented fiber web to form a sheetlike structure which has loops on one side and has loop feet or pile fiber folds on the other side, but possesses neither threads nor prefabricated sheetlike structures. A web of this kind as well has been produced for a relatively long time, for example on stitchbonding machines of the "Malimo" type from the company Karl Mayer. A further characterizing feature of this web is that, as a longitudinal-fiber web, it is able to absorb high tensile forces in the longitudinal direction. The characteristic feature of a Multiknit web relative to the Kunit web is that the web is consolidated on both the top and bottom sides by virtue of the double-sided needle punching. The starting product used for a Multiknit is generally one or two single-sidedly interlooped pile fiber nonwovens produced by the Kunit process. In the end product, both top sides of the nonwovens are shaped by means of interlooped fibers to form a closed surface, and are joined to one another by fibers which stand almost perpendicularly. An additional possibility is to introduce further needlable sheetlike structures and/or scatterable media.

Finally, stitchbonded webs as an intermediate are also suitable for forming an adhesive tape. A stitchbonded web is formed from a nonwoven material having a large number of stitches extending parallel to one another. These stitches are brought about by the stitching-in or stitchbonding of continuous textile threads. For this type of web, stitchbonding machines of the "Malimo" type from the company Karl Mayer are known; the web itself is called a Maliwatt.

Also particularly suitable are needlefelt webs. In a needlefelt web, a tuft of fibers is made into a sheetlike structure by means of needles provided with barbs. By alternate introduction and withdrawal of the needles, the material is consolidated on a needle bar, with the individual fibers interlooping to form a firm sheetlike structure. The number and configuration of the needling points (needle shape, penetration depth, double-sided needling) determine the thickness and strength of the fiber structures, which are in general lightweight, air-permeable and elastic.

Also particularly advantageous is a staple fiber web which is mechanically preconsolidated in the first step or is a wet-laid web laid hydrodynamically, in which between 2 wt % and 50 wt % of the web fibers are fusible fibers, more particularly between 5 wt % and 40 wt % of the web fibers.

A web of this kind is characterized in that the fibers are laid wet or, for example, a staple fiber web is preconsolidated by the formation of loops from fibers of the web by needling, stitching or air-jet and/or water-jet treatment.

In a second step, thermofixing takes place, with the strength of the web being increased again by the melting, or partial melting, of the fusible fibers.

Furthermore, the carrier may be compacted by calendering on a roll mill. The two rolls preferably run in opposite directions and at the same peripheral speed, causing the carrier to be pressed and compacted.

If there is a difference in the peripheral speed of the rolls, then the carrier is additionally polished.

The carrier is preferably a woven fabric, more preferably a woven polyester fabric. Particular preference is given to woven fabrics having the following construction:

The thread count in the warp is 10 to 60/cm.
The thread count in the weft is 10 to 40/cm.
The warp threads possess a yarn weight of between 40 and 400 dtex, more particularly between 44 and 330 dtex, very preferably of 167 dtex.
The weft threads possess a yarn weight of between 40 and 660 dtex, more preferably between 44 and 400 dtex, very preferably of 167 dtex.

According to a further advantageous embodiment of the invention, the thread count in the warp is 40 to 50/cm, preferably 44/cm.

According to a further advantageous embodiment of the invention, the thread count in the weft is 18 to 22/cm, preferably 20/cm.

According to a further advantageous embodiment of the invention, the woven fabric is a woven polyester fabric. Further possibilities are woven polyamide fabrics, woven viscose fabric and/or a woven blend fabric comprising the stated materials.

With further preference, the thickness of the woven fabric is at most 300 μm, more preferably 170 to 230 μm, very preferably 190 to 210 μm.

According to another advantageous embodiment of the invention, the carrier has a basis weight of up to 200 $g/m^2$, preferably 100 to 150 $g/m^2$.

Starting materials for the carrier material for the adhesive tape are more particularly (manmade) fibers (staple fiber or continuous filament) made from synthetic polymers, also called synthetic fibers, made from polyester, polyamide, polyimide, aramid, polyolefin, polyacrylonitrile or glass, (manmade) fibers made from natural polymers such as cellulosic fibers (viscose, Modal, Lyocell, Cupro, acetate, triacetate, Cellulon), such as rubber fibers, such as plant protein fibers and/or such as animal protein fibers and/or natural fibers made of cotton, sisal, flax, silk, hemp, linen, coconut or wool. The present invention, however, is not confined to the materials stated; it is instead possible, as evident to the skilled person without having to take an inventive step, to use a multiplicity of further fibers in order to produce the carrier.

Likewise suitable, furthermore, are yarns fabricated from the fibers specified.

In the case of woven fabrics or laid scrims, individual threads may be produced from a blend yarn, and thus may have synthetic and natural constituents. Generally speaking, however, the warp threads and the weft threads are each formed of a single kind.

The warp threads and/or the weft threads here may in each case be composed only of synthetic threads or only of threads made from natural raw materials—in other words, of a single kind.

The yarns or threads of the woven fabrics may be in the form of filaments. For the purposes of this invention, a filament refers to a bundle of parallel individual linear fibers/filaments, often also referred to in the literature as a multifilament. This fiber bundle may optionally be given inherent strengthening by torsion, and is then referred to as spun or folded filaments. Alternatively, the fiber bundle can be given inherent strengthening by entangling using compressed air or waterjets. In the text below, for all of these embodiments, only the term "filament" will be used, in a generalizing way.

The filament may be textured or smoothed and may have point strengthening or no strengthening.

The general expression "adhesive tape" in the context of this invention encompasses all sheetlike structures such as two-dimensionally extended sheets or sheet sections, tapes with extended length and limited width, tape sections and the like, and also, lastly, diecuts or labels.

The adhesive tape therefore has a longitudinal extent and a latitudinal extent. The adhesive tape also has a thickness, extending perpendicularly to both extents, with the latitudinal extent and longitudinal extent being greater by a multiple than the thickness. The thickness is very largely the same, preferably exactly the same, over the entire superficial extent of the adhesive tape defined by length and width.

The adhesive tape is present in particular in the form of a sheet web. A sheet web is an object whose length is greater by a multiple than the width, with the width being approximately and preferably exactly the same along the entire length.

The adhesive tape may be produced in the form of a roll, in other words rolled up onto itself in the form of an Archimedean spiral.

Applied to the reverse of the adhesive tape may be a reverse-face varnish, in order to exert a favorable influence on the unwind properties of the adhesive tape wound into the Archimedean spiral. This reverse-face varnish may for this purpose be furnished with silicone compounds or fluorosilicone compounds and also with polyvinylstearylcarbamate, polyethyleneiminestearylcarbamide or organofluorine compounds as adhesive substances.

The dispersion-based adhesive may be applied in the longitudinal direction of the adhesive tape, in the form of a stripe, the width of the stripe being lower than that of the carrier of the adhesive tape.

Depending on the particular utility, there may also be a plurality of parallel stripes of the dispersion-based adhesive coated on the carrier material.

The position of the stripe on the carrier is freely selectable, with preference being given to an arrangement directly at one of the edges of the carrier.

The dispersion-based adhesive is preferably applied over the full area on the carrier.

Provided on the adhesive coating of the carrier there may be at least one stripe of a covering, extending in the longitudinal direction of the adhesive tape and covering between 20% and 90% of the adhesive coating.

The stripe preferably covers in total between 50% and 80% of the adhesive coating. The degree of coverage is selected according to the application and to the diameter of the cable harness.

The percentage figures indicated relate to the width of the stripes of the covering in relation to the width of the carrier.

In accordance with one preferred embodiment of the invention there is precisely one stripe of the covering present on the adhesive coating.

The invention is described with reference to a working example and a figure. In the case of the latter FIG. 1 shows a sectional view of an apparatus for implementing the adhesive tape production method of the invention, and Depicted in FIG. 1 in a sectional view, schematically, is an apparatus for applying a layer 8 of adhesive to a textile carrier 2. The apparatus comprises a coating roll 3, over which the textile carrier 2 is steered. The coating roll 3 is connected to a motor, which rotates the coating roll 3 and gives the textile carrier 2 an advance in a feed direction V. The direction of rotation can be changed.

Besides the coating roll 3 there is a dual slot die 4. The coating roll 3 and the dual slot die 4 have the same longitudinal extent in their longitudinal direction L, which stands perpendicularly on the drawing plane. The dual slot die 4 here has a longitudinal extent of its two slots, which are of equal length, of 1600 mm. Other lengths are of course also possible.

The dual slot die 4 and the coating roll 3 are disposed parallel to one another. They are preferably at a distance from one another and between them form a slot 6 of constant width, through which the textile carrier 2 is passed. During the coating operation, the textile carrier 2 is drawn through the slot 6 and guided around the coating roll 3, from bottom to top right in FIG. 1. During the coating operation, an (ASE) thickener-water mixture 7 is first applied through a first slot die 7a to a side of the textile carrier 2 remote from the coating roll 3. The (ASE) thickener-water mixture 7 has been prepared beforehand in a stirred tank. Here, water is present in excess, and so the thickener is saturated and cannot bind further water anymore. The height of the first slot die 7a is about 100 μm, preferably exactly 100 μm. The length of the first slot die 7a is 1600 mm.

A second slot die 8a, disposed successively in the feed direction V of the textile carrier 2, allows a dispersion-based adhesive 8 to be applied to the thickener 7 which has been applied to an adhesive side 2a of the textile carrier 2. The second slot die 8a has a length of likewise 1600 mm and a height of 300 μm. The (ASE) thickener-water mixture 7 is applied in the form of a thickener layer to the textile carrier 2, and the adhesive dispersion 8 is applied in the form of a dispersion-based adhesive layer to the textile carrier 2.

The viscosity of the (ASE) thickener-water mixture 7 is higher than that of the adhesive dispersion 8, specifically a viscosity of η=10 Pa*s for the adhesive dispersion 8 and η=60 Pa*s for the (ASE) thickener-water mixture 7. Applied as adhesive dispersion 8 is an acrylate adhesive diluted with water. The adhesive dispersion 8 is applied with a coat weight of 70 g/m². The textile carrier 2 used is a PET web. The (ASE) thickener-water mixture 7 has been coated onto the PET web with a coat weight of 2 g/m². The thickener used was Sera Print M-PHC. First of all, the (ASE) thickener-water mixture 7 sinks immediately into the textile carrier 2 on coating. Because of the thickener layer, the adhesive dispersion, applied only a few microseconds after the application of the (ASE) thickener-water mixture, sinks only a little into the carrier 2. Arranged downstream of the coating roll 3 in the feed direction V is a drying facility, not shown here, which dries the applied layer 8 of adhesive and the thickener layer 7 and provides the completed adhesive tape 1.

LIST OF REFERENCE SIGNS

1 adhesive tape
2 textile carrier
2a adhesive side
3 coating roll
4 dual slot die
6 slot
7 thickener
7a first slot die
8 adhesive dispersion
8a second slot die
L longitudinal direction
V feed direction

The invention claimed is:

1. A method for producing an adhesive tape, comprising the following steps:
 a) producing a thickener-water mixture using water and a thickener;
 b) producing an adhesive dispersion from an adhesive and a solvent;
 c) providing a textile carrier;
 d) applying the thickener-water mixture to the textile carrier;
 e) applying the adhesive dispersion to the thickener-water mixture, to give the adhesive tape;
 f) drying the adhesive tape obtained, wherein in the thickener water mixture, water is present in excess such that the thickener-water mixture is saturated with water and, the application of the adhesive dispersion takes place after, or synchronously with, the applying of the thickener-water mixture.

2. The method of claim 1, wherein the weight ratio of water to thickener, is from 1:1 to 10:1.

3. The method of claim 1 wherein the thickener-water mixture contains from 5 up to 25 wt % of the same adhesive which is also present in the adhesive dispersion.

4. The method of claim 1 wherein the adhesive dispersion contains up to 20 wt % of a thickener.

5. The method of claim 1 wherien the thickener is an ASE or HASE thickener.

6. The method of claim 1 wherein the thickener is applied over the full area to the textile carrier.

7. The method of claim 1 wherein the adhesive dispersion is applied over the full area.

8. The method of claim 1 wherein a dual slot die is used for applying the thickener-water mixture and the adhesive dispersion.

9. The method of claim 1 wherein the dispersion-based adhesive is used with a viscosity of 0.2 Pa*s to 15 Pa*s±5 Pa*s.

10. The method of claim 1 wherein the thickener-water mixture has a viscosity similar to or higher than that of the adhesive dispersion.

11. The method of claim 1 wherein the dispersion adhesive used comprises a polymer dispersion, the polymer synthesized from:
 95.0 to 100.0 wt % of n-butylacrylate and/or 2-ethylhexylacrylate
 0.0 to 5.0 wt % of an ethylenically unsaturated monomer having an acid function or acid anhydride function.

12. The method of claim 1, wherein the thickener used comprises water-soluble polyacrylic acids and polycoacrylic acids.

13. The method of claim 1, wherein the textile carrier used comprises a drawn-loop knit, laid scrim, tape, braid, needle pile textile, felt, woven fabric or a nonwoven web, or a Maliwatt web.

14. The method of claim 8, wherein the dual slot die used has a slot width of 100 μm to 300 μm.

15. The method as of claim 1, wherein the dried adhesive tape is wound up to a roll.

16. The method of claim 1, wherein the thickener is an alkali swellable emulsion thickener.

* * * * *